United States Patent [19]
Bennett et al.

[11] Patent Number: 6,157,380
[45] Date of Patent: Dec. 5, 2000

[54] GENERIC MECHANISM TO CREATE OPENDOC PARTS FROM WORKPLACE SHELL OBJECTS

[75] Inventors: Paul W. Bennett, Roundrock; Sheila A. Harnett, Austin; Deepa S. Desai, Austin; Salil J. Kulkarni, Austin; Ann M. Robinson, Roundrock, all of Tex.; Duane S. Wood, Jacksonville, Fla.

[73] Assignee: International Business Machines Corporation, Armonk, N.Y.

[21] Appl. No.: 08/740,941

[22] Filed: Nov. 5, 1996

[51] Int. Cl.[7] .................................................. G06F 9/46
[52] U.S. Cl. ........................... 345/335; 345/348; 345/355
[58] Field of Search ................................... 345/340, 343, 345/346, 348, 349, 131, 339, 355, 334, 335; 395/569, 680, 682; 709/310, 328, 329, 320; 707/102, 103

[56] References Cited

U.S. PATENT DOCUMENTS

| | | | |
|---|---|---|---|
| 5,079,695 | 1/1992 | Dysart et al. ............................. | 395/700 |
| 5,287,447 | 2/1994 | Miller et al. ............................. | 395/157 |
| 5,349,658 | 9/1994 | O'Rourke et al. ....................... | 395/700 |
| 5,367,633 | 11/1994 | Matheny et al. ......................... | 395/164 |
| 5,392,389 | 2/1995 | Fleming .................................... | 395/159 |
| 5,394,521 | 2/1995 | Henderon, Jr. et al. ................. | 395/158 |
| 5,428,734 | 6/1995 | Haynes et al. ............................ | 395/159 |
| 5,437,008 | 7/1995 | Gay et al. ................................. | 395/161 |
| 5,459,832 | 10/1995 | Wolf et al. ............................... | 395/155 |
| 5,463,726 | 10/1995 | Price ......................................... | 395/155 |
| 5,467,441 | 11/1995 | Stone et al. .............................. | 395/133 |

OTHER PUBLICATIONS

Brockschmidt, Kraig; "Introducing OLE 2.0, Part I: Windows Objects and the Components Object Model."; Microsoft Systems Journal; pp. 1–17, Aug. 1993.

Person et al.; Using Windows 3.1; Que Corporation; pp. 192–193, 207–210, 222–236, 249, 1993.

Microsoft; "The Component Object Model Technical Overview"; Microsoft Corporation; pp. 1–15, Dec. 1994.

*Primary Examiner*—Zarni Maung
*Assistant Examiner*—Gary Scott Fourson
*Attorney, Agent, or Firm*—David A. Mims, Jr.; Felsman, Bradley, Vaden, Gunter & Dillon, LLP

[57] ABSTRACT

In transferring a user application from an original user environment to a new user environment by dragging and dropping a graphical image representative of the user application, a new object or "shadow part" is automatically created in the new user environment with the same attributes as the user application in the original user environment. The new object also inherits the characteristics of other objects in the new user environment. The new object may optionally be linked to the original user application so that setting changes in one user environment are reflected in the other.

20 Claims, 4 Drawing Sheets

WPObject
|
WPAbstract
|
WPClock (a)

ODPart
|
HomePlacePart
|
ShadowPart (b)

GENERIC MECHANISM TO CREATE OPENDOC PARTS FROM WORKPLACE SHELL OBJECTS

BACKGROUND OF THE INVENTION

1. Technical Field

The present invention relates in general to moving objects between user environments in data processing systems and in particular to copying or moving objects in the user interface of one user environment to another user environment in a data processing system. Still more particularly, the present invention relates to copying or moving an object from one user environment to another user environment while retaining its original properties or settings and being augmented by additional behaviors, properties, and settings in the new user environment.

2. Description of the Related Art

Frequently, modern operating systems in data processing systems are capable of supporting more than one type of user environment. As a result, user applications are being written to operate in any user environment. One manner by which user applications are being created which can operate in any user environment is by implementing the applications as software objects using and open document interchange and display architecture.

Open document interchange and display architectures are useful in a variety of user applications such as word processors and spread sheets. Contemporary open document architectures support compound documents, which can be constructed to simultaneously contain text, video images, sound objects, mathematical calculations, etc. One example of a contemporary open document architecture is the "OpenDoc" architecture, described in *IBM OpenDoc OS/2 Programming Guide*, Copyright 1994, 1995 IBM Corporation.

The OpenDoc architecture is supported by the OS/2 operating system, a product of International Business Machines Corporation located in Armonk, N.Y., which provides a graphical user interface called the Workplace Shell. Both OpenDoc and the Workplace Shell are based on the System Object Model (SOM), a technology designed to avoid language dependence in Object Oriented Programming (OOP). SOM is a language-independent, object-oriented technology for building, packaging, and manipulating binary class libraries. The SOM runtime environment, in which Workplace Shell objects operate, is currently available in the OS/2 and AIX operating systems, both products of International Business Machines Corporation located in Armonk, N.Y., and as a separate add-on to the Windows operating system. SOM objects created for one user environment may be easily ported to another SOM-based user environment.

In an operating system that supports multiple types of user environments (or type shells), it would be desirable to copy or move an object from the user interface of one user environment to another user environment, retain the objects original properties and settings, and augment the object with additional behaviors, properties, and settings for the new user environment.

SUMMARY OF THE INVENTION

It is therefore one object of the present invention to provide a method for moving objects between user environments in data processing systems.

It is another object of the present invention to provide a method for copying or moving objects in the user interface of one user environment to another user environment in a data processing system.

It is yet another object of the present invention to provide a method for copying or moving an object from one user environment to another user environment while retaining its original properties or settings and being augmented by additional attributes (behaviors, properties, and settings) in the new user environment.

The foregoing objects are achieved as is now described. In transferring a user application from an original user environment to a new user environment by dragging and dropping a graphical image representative of the user application, a new object or "shadow part" is automatically created in the new user environment with the same attributes as the user application in the original user environment. The new object also inherits the characteristics of other objects in the new user environment. The new object may optionally be linked to the original user application so that setting changes in one user environment are reflected in the other.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
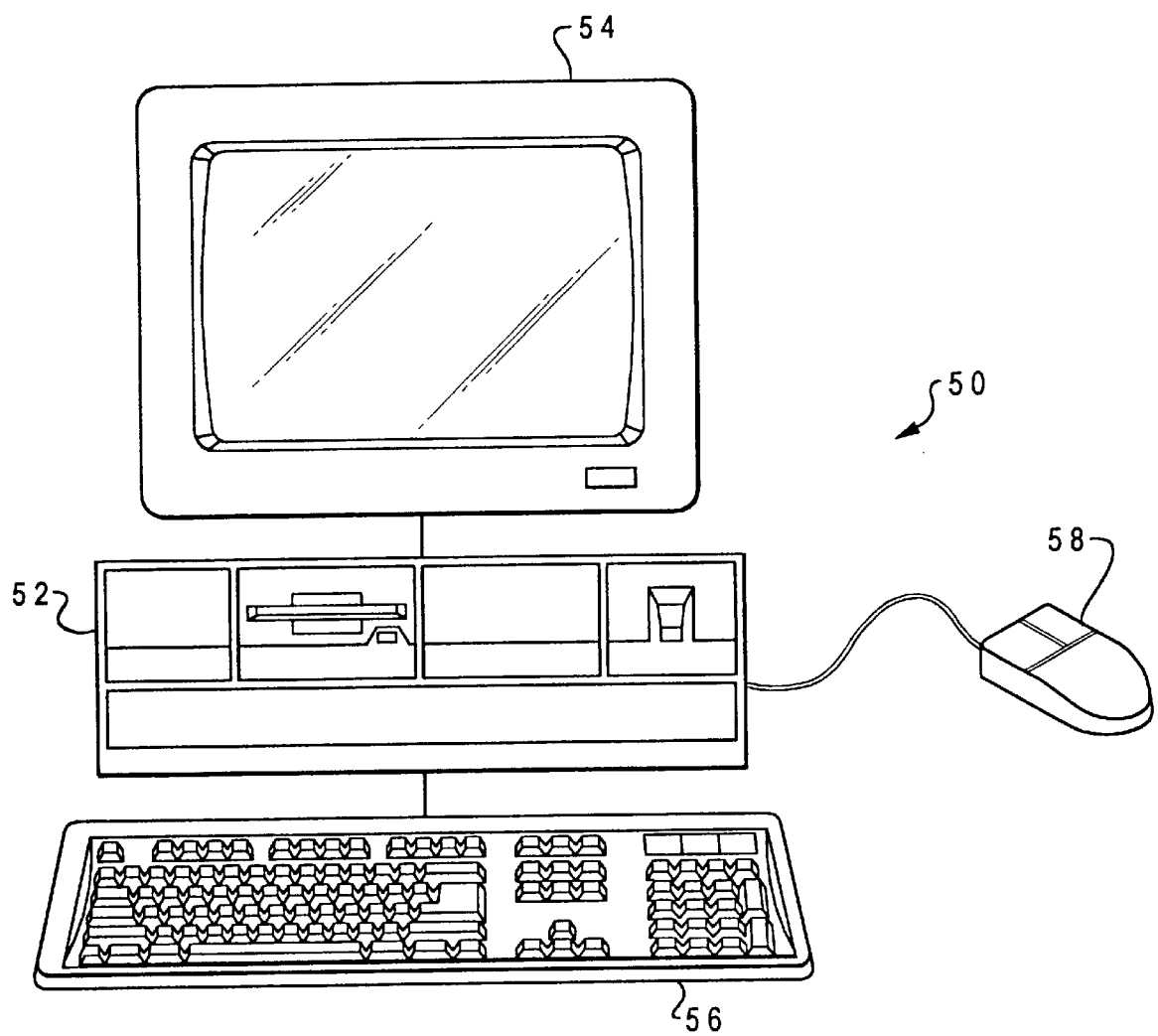
FIG. 1 depicts a pictorial representation of a data processing system in which a preferred embodiment of the present invention may be implemented.

With reference now to the figures and in particular with reference to FIG. 1, there is depicted a pictorial representation of a data processing system in which a preferred embodiment of the present invention may be implemented. A personal computer 50 is depicted which includes a system unit 52, a video display terminal 54, a keyboard 56, and a mouse 58. Personal computer 50 may be any suitable computer such as an IBM PC computer, a product of International Business Machines Corporation, located in Armonk, N.Y. Although the depicted embodiment involves a personal computer, a preferred embodiment of the present invention may be implemented in other types of data processing systems, such as for example, intelligent work stations or mini-computers.

Figure 2:
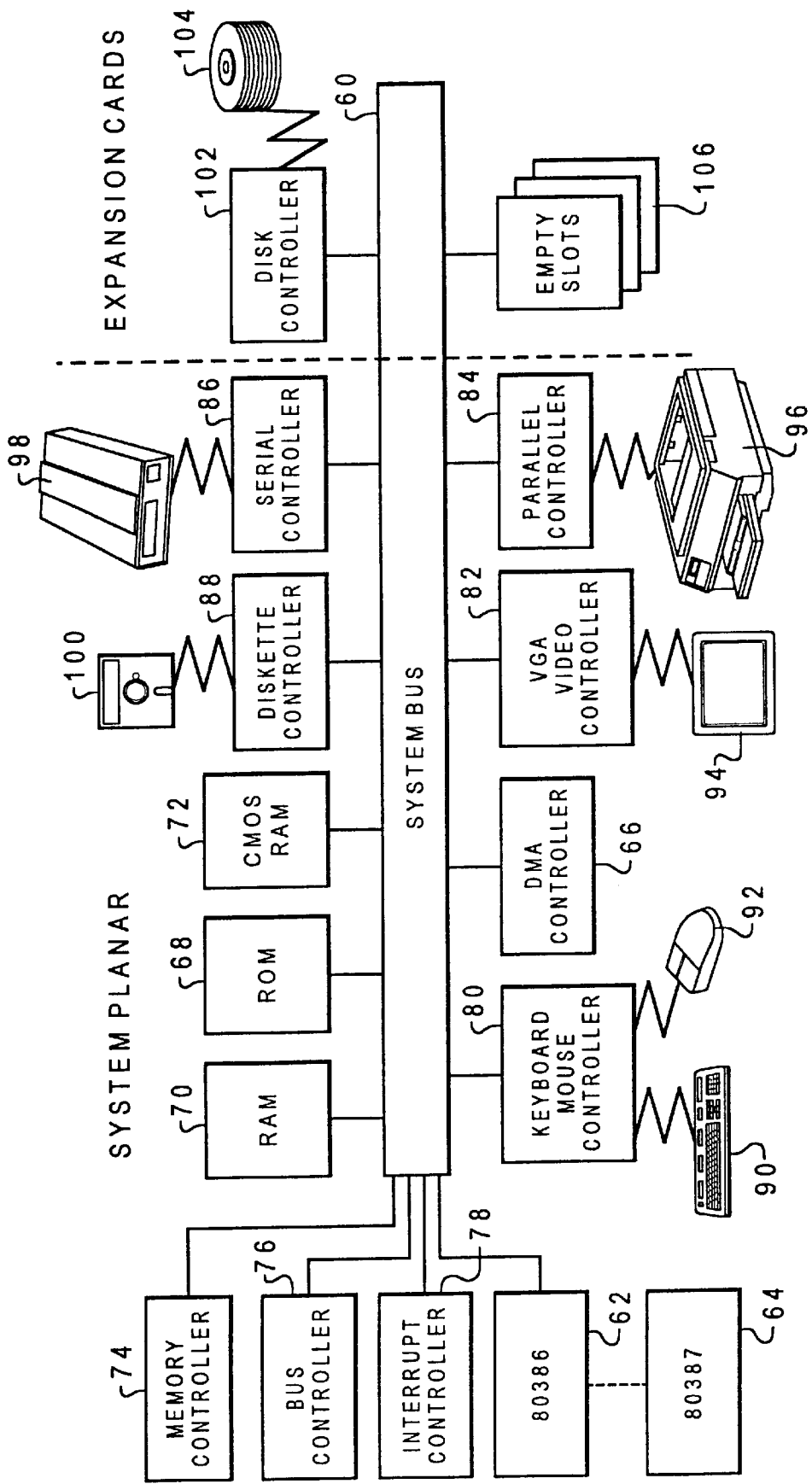
FIG. 2 is a block diagram of selected components in data processing system in which a preferred embodiment of the present invention may be implemented.

Referring now to FIG. 2, there is depicted a block diagram of selected components in data processing system in which a preferred embodiment of the present invention may be implemented. System unit 52 preferably includes a system bus 60 for interconnecting and establishing communication between various components in system unit 52. Microprocessor 62 is connected to system bus 60, and also may be connected to numeric coprocessor 64. Direct memory access (DMA) controller 66 is also connected to system bus 60 and allows various devices to appropriate cycles from microprocessor 62 during large I/O transfers.

Read Only Memory (ROM) 68 and Random Access Memory (RAM) 70 are also connected to system bus 60. ROM 68 contains the power-on self test (POST) and the Basic Input/Output System (BIOS) which control hardware operations, such as those involving disk drives and the keyboard. Read only memory (ROM) 68 is mapped into the microprocessor 62 address space. CMOS RAM 72 is attached to system bus 60 and contains system configuration information.

Also connected to system bus 60 are memory controller 74, bus controller 76, and interrupt controller 78 which serve to aid in the control of data flow through system bus 60 between various peripherals, adapters, and devices. System unit 52 also contains various input/output (I/O) controllers such as: keyboard and mouse controller 80, video controller 82, parallel controller 84, serial controller 86, and diskette controller 88. Keyboard and mouse controller 80 provide a hardware interface for keyboard 90 and mouse 92. Video controller 82 provides a hardware interface for video display terminal 94. Parallel controller 84 provides a hardware interface for devices such as printer 96. Serial controller 86 provides a hardware interface for devices such as a modem 98. Diskette controller 88 provides a hardware interface for floppy disk unit 100. Expansion cards also may be added to system bus 60, such as disk controller 102, which provides a hardware interface for hard disk unit 104. Empty slots 106 are provided so that other peripherals, adapters, and devices may be added to system unit 52.

Those skilled in the art will appreciate that the hardware depicted in FIG. 2 may vary for specific applications. For example, other peripheral devices such as: optical disk drive, an audio adapter, high resolution graphics adapter, and the like also may be utilized in addition to or in place of the hardware already depicted to enable personal computer 50 to present multimedia presentations to a user.

Figure 3:
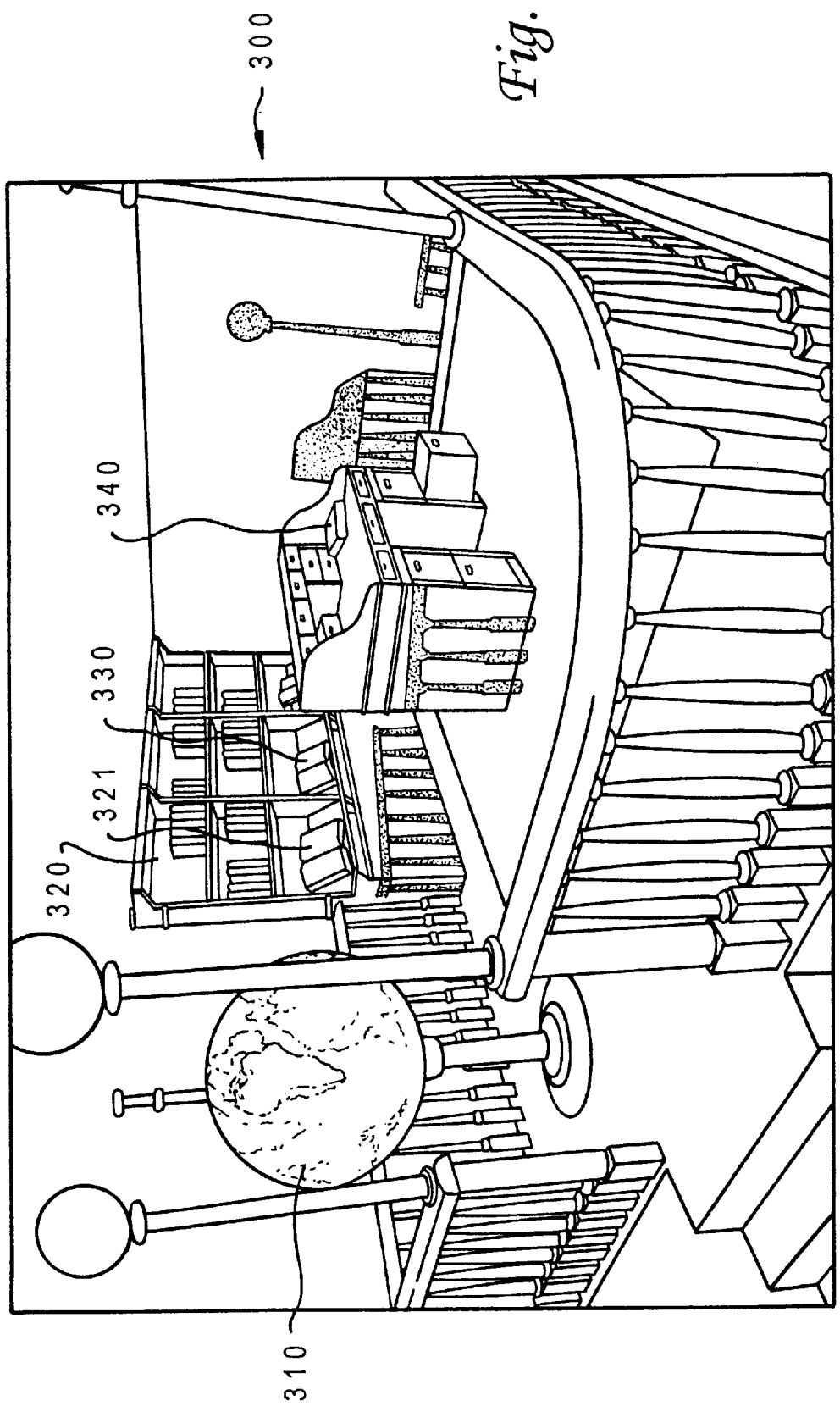
FIG. 3 depicts a pictorial representation of a user interface for a high level user environment in accordance with a preferred embodiment of the present invention.

With reference now to FIG. 3, a pictorial representation of a graphic user interface for high level user environment in accordance with a preferred embodiment of the present invention. In the depicted example, the user environment is a "HomePlace Shell" environment supported by the OS/2 operating system and implementing its user interface through graphical representations of objects in the form of OpenDoc parts. The OS/2 operating system also supports other user environments, such as the default "WorkPlace Shell." These user environments, their implementations, and the supporting operating system are selected merely as convenient examples for the purposes of illustrating the present invention.

The WorkPlace Shell utilizes the metaphor of a desktop and objects which may be manipulated by a pointing device for its user interface. A system clock object in the WorkPlace Shell may have properties such as: how to display itself (analog or digital); what colors or fonts to use (for the background, hour/minute hands, numbers, etc.); and what icon to present when the object is closed or minimized. The object would also have a defined behavior, which might, for example, include an alarm function.

The desktop metaphor of the WorkPlace Shell is a high-level user model when compared to the command line user interface utilized by several prior operating systems. However, even higher level user models for a user interface exist, in which objects may be three-dimensional and rendered with a realistic appearance in the user interface, as opposed to iconic representations. Users may be able to spatially navigate within the user environment using a pointing device. Applications may render themselves as nonrectangular frames. These and other features may be found in higher-level user environments.

One example of such a higher-level user environment is the HomePlace Shell. The user interface 300 depicted in FIG. 3 for HomePlace Shell includes, for example, a globe 310, which might represent a geography application, a bookcase 320 containing books 321, which might represent documents and their associated viewer, and a video unit 330, which might represent a video player application. In the HomePlace Shell, objects have realistic renderings and are "alive" all the time rather than merely having two states: open (running) and closed (not running). Object representations maintain a spatial relationship with other object representations in the user interface and change their visual rendering based on the navigation of the user through the environment. Thus, the user interface would present a different view if the user navigated to a point nearby desk 340 in the depicted example.

As applications are created for a new user environment such as the HomePlace Shell, substantial savings and efficiencies could be achieved if one could "recycle" rather than abandon the legacy of objects and applications from a previous user environment such as the WorkPlace Shell. The present invention provides a mechanism that preserves the functionality of objects and allows their use in the higher level environment.

Figures 4, 5:
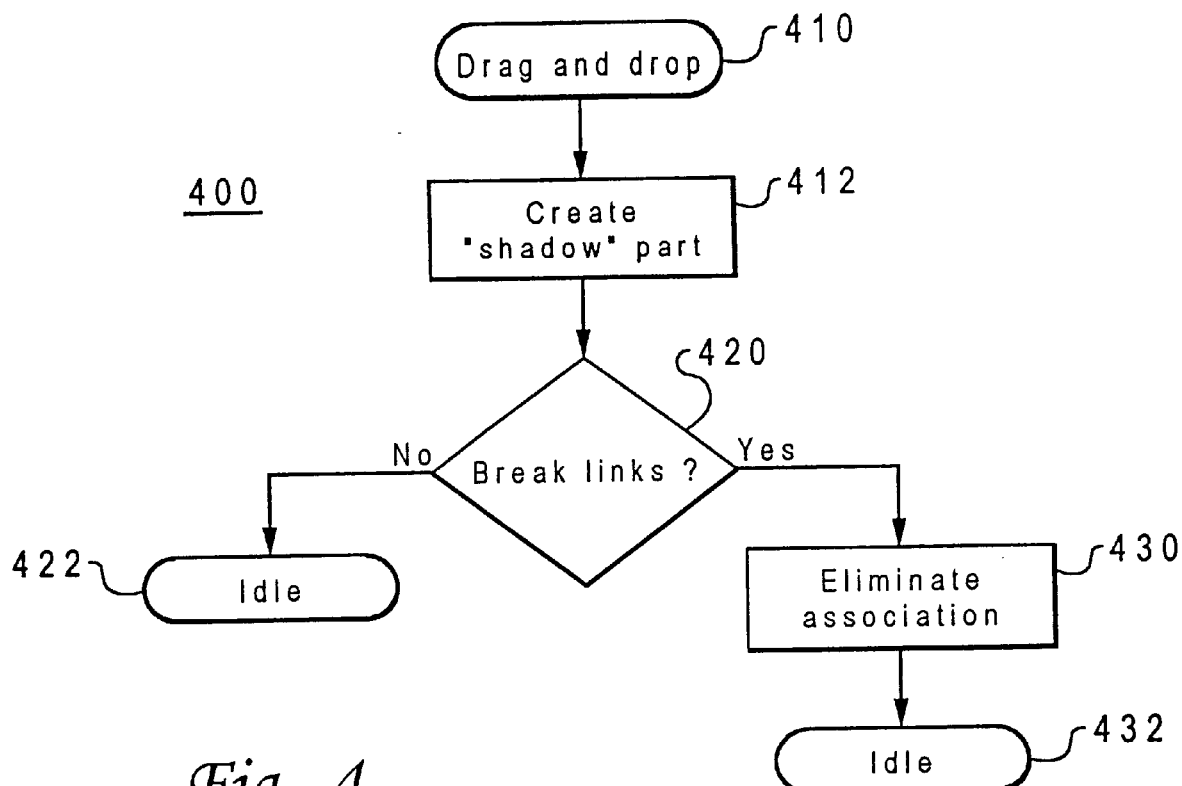
FIG. 4 is a high level flowchart for the process by which objects are copied into a high level user environment in accordance with a preferred embodiment of the present invention.
FIG. 5 depicts class heirarchies for objects in different user environments in a data processing system in accordance with a preferred embodiment of the present invention.

Referring now to FIG. 4, a high level flowchart for the process by which objects are copied or transferred into a high level user environment is illustrated in accordance with a preferred embodiment of the present invention. The process 400 begins at step 410, which depicts a drag-and-drop operation by the user while both user environments are graphically represented in the user interface. For example, the user may select a graphical representation of the clock object from the desktop of the WorkPlace Shell, dragging it and dropping it into the HomePlace Shell. By this action, the clock object is copied into the HomePlace Shell user environment.

The process next proceeds to step 420, which illustrates automatic creation of a "shadow part," a special kind of object in the new user environment. In the case of the clock object being transferred from the WorkPlace Shell to the HomePlace Shell, the clock object may have been implemented as an instance of the WPClock class in the WorkPlace Shell class hierarchy.

With reference to FIG. 5, class heirarchies for objects in different user environments in a data processing system are depicted in accordance with a preferred embodiment of the present invention. With respect to the clock object of the example being described, FIG. 5(*a*) depicts the class hierarchy for the clock object in the WorkPlace Shell class hierarchy.

When the WorkPlace Shell object was transferred to the HomePlace Shell by dropping a graphical representation of the object into the HomePlace Shell, a new part (OpenDoc object) was automatically created, an instance of Shadow-Part within the class hierarchy of the new user environment.

FIG. 5(b) depicts one possible class hierarchy of the new "ShadowPart" for the clock object. This instance of ShadowPart has all the behaviors and properties of the WPClock object (e.g., analog vs. digital). When viewed in the HomePlace Shell, the ShadowPart instance will also have the same settings as the WPClock object (i.e., the time displayed), but may have a visual representation closer aligned with the higher-level shell (e.g., a grandfather clock).

The instance of ShadowPart created is linked to the original instance of WPClock in the WorkPlace Shell. Thus, when the time was changed by the user via the ShadowPart in the HomePlace Shell, the time for the clock object in the WorkPlace Shell will also be changed. The ShadowPart will be able to communicate with the WPClock object through its well-defined interface to set and query the WorkPlace Shell settings of the linked object. However, being an instance of a subclass of HomePlacePart, it will also inherit all the characteristics of an object used in implementing the user interface of the HomePlace Shell.

The ShadowPart instance will take on a visual representation based on the data it can query from the WorkPlace Shell object, but may scale and translate the data to fit in better with other HomePlace Shell objects. Furthermore, as the user navigates through the HomePlace Shell and changes perspectives, the ShadowPart instance (like all other HomePlaceParts) will adjust its visual representation accordingly (e.g., from the side, straight on, out of view, etc.).

Referring back to FIG. 4, the process then passes to step 420, which depicts a determination of whether the user wishes to keep or break the link between object in the original user environment and the object or part in the new user environment. That is, the user is provided with the option of breaking the link between the ShadowPart instance and the WPClock object which causes property changes in one user environment to be reflected in the other user environment. This option of breaking the link may also be provided to the user as other times during the life of the ShadowPart.

If the user wishes to maintain the link, the process passes to step 422, which illustrates the process becoming idle until an event occurs requiring further involvement by the process. Otherwise, the process passes first to step 430, which depicts an elimination of the association between the shadow part and the original object, and then to step 432, which also illustrates the process becoming idle until further involvement is required.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method, in a data processing system having a display screen and means for manipulating display items on the display screen, of transferring a user application having a plurality of data and visual attributes from an original user environment employing a first set of visual attributes to implement a user interface for objects in the original user environment to a new user environment employing a second, different set of visual attributes to implement a user interface for objects in the new user environment, comprising:

displaying the original user environment on the display screen;

displaying the new user environment on the display screen;

displaying a graphical image representative of the user application on the display screen in the original user environment;

responsive to the graphical image being dragged from the original user environment and dropped in the new user environment, automatically creating an object in the new user environment having data attributes of the user application in the original user environment and inheriting visual attributes employed for other objects in the new user environment.

2. The method of claim 1, further comprising:

creating a link between the object in the new user environment and the user application in the original application wherein changes to data attributes of the user application are reflected by the object without affecting visual attributes of the object.

3. The method of claim 2, wherein a link between the user application in the original user environment and the object in the new user environment may be optionally destroyed.

4. The method of claim 1, wherein the object is an OpenDoc part.

5. The method of claim 4, wherein the new user environment is implemented as a plurality of OpenDoc parts.

6. The method of claim 5, wherein the object is an instance of a class including the plurality of OpenDoc parts.

7. The method of claim 5, wherein the object inherits visual attributes common to the plurality of OpenDoc parts.

8. The method of claim 1, wherein the object is a shadow part comprising a link between the object and the user application wherein changes to data attributes of the user application are reflected by the object without affecting visual attributes of the object.

9. A data processing system, for transferring a user application having a plurality of data and visual attributes from an original user environment to a new user environment, comprising:

a display screen;

pointing means for manipulating graphical items on the display screen;

first display means for displaying the original user environment on the display screen;

second display means for displaying the new user environment on the display screen;

third display means for displaying a graphical image representative of the user application on the display screen in the original user environment;

origination means, responsive to the graphical image being dragged from the original user environment and dropped in the new user environment, for automatically creating an object in the new user environment having data attributes of the user application in the original user environment and inheriting visual attributes employed for other objects in the new user environment.

10. The data processing system of claim 9, further comprising:
 a link between the object in the new user environment and the user application in the original user environment wherein changes to data attributes of the user application are reflected by the object without altering visual attributes of the object.

11. The data processing system of claim 10, wherein the link may be optionally destroyed.

12. The data processing system of claim 9, wherein. the object is an OpenDoc part.

13. The data processing system of claim 12, wherein the new user environment is implemented as a plurality of OpenDoc parts.

14. The data processing system of claim 13, wherein the object is an instance of a class including the plurality of OpenDoc parts.

15. The data processing system of claim 13, wherein the object inherits visual attributes common to the plurality of OpenDoc parts.

16. The data processing system of claim 9, wherein the object is a shadow part comprising a link between the object and the user application wherein changes to data attributes of the user application are reflected by the object without affecting visual attributes of the object.

17. A storage device readable by a data processing system and encoding executable instructions for transferring a user application having a plurality of data and visual attributes from an original user environment to a new user environment in a data processing system having a display screen and means for manipulating graphical items on the display screen, comprising:
 first instruction means for displaying the original user environment on the display screen;
 second instruction means for displaying the new user environment on the display screen;
 third instruction means for displaying a graphical image representative of the user application on the display screen in the original user environment;
 fourth instruction means, responsive to the graphical image being dragged from the original user environment and dropped in the new user environment, for automatically creating an object in the new user environment having data attributes of the user application in the original user environment and inheriting visual attributes employed for other objects in the new user environment.

18. The storage device of claim 17, wherein the storage device is a hard disk drive.

19. The storage device of claim 17, wherein the storage device is a ROM for use within the data processing system.

20. The storage device of claim 17, wherein the storage device is a floppy diskette.

* * * * *